United States Patent
Chang et al.

(10) Patent No.: US 9,706,133 B2
(45) Date of Patent: Jul. 11, 2017

(54) ELECTRONIC DEVICE AND IMAGE PROCESSING METHOD

(71) Applicant: Wistron Corporation, New Taipei (TW)

(72) Inventors: Yao-Tsung Chang, New Taipei (TW); Chu-Chia Tsai, New Taipei (TW); Ping-Hung Chen, New Taipei (TW); I-Chun Wu, New Taipei (TW); Chih-Yang Hung, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 14/988,774

(22) Filed: Jan. 6, 2016

(65) Prior Publication Data
US 2017/0041533 A1 Feb. 9, 2017

(30) Foreign Application Priority Data
Aug. 4, 2015 (TW) .............................. 104125231 A (51) Int. Cl.
*H04N 5/262* (2006.01)
*H04N 5/235* (2006.01)
*H04N 5/247* (2006.01)

(52) U.S. Cl.
CPC ......... *H04N 5/2621* (2013.01); *H04N 5/2353* (2013.01); *H04N 5/247* (2013.01)

(58) Field of Classification Search
None
See application file for complete search history.

(56) References Cited

U.S. PATENT DOCUMENTS

| 2009/0231465 A1* | 9/2009 | Senba | H04N 5/23248 348/229.1 |
| 2012/0093394 A1* | 4/2012 | Li | H04N 13/0011 382/154 |
| 2016/0050374 A1* | 2/2016 | Shabtay | H04N 5/2258 348/240.3 |

FOREIGN PATENT DOCUMENTS

| JP | 2009218893 A | 9/2009 |
| TW | 201216204 A1 | 4/2012 |

OTHER PUBLICATIONS

TIPO Office Action dated Mar. 14, 2016 in corresponding Taiwan application (No. 104125231).
(Continued)

*Primary Examiner* — James Hannett
(74) *Attorney, Agent, or Firm* — McClure, Qualey & Rodack, LLP (57) ABSTRACT

An image processing method is provided. The method includes following steps. Firstly, a first image is obtained by shooting photo at a first shutter speed, wherein the first image includes a first object image and a first background image, and the first object image and the first background image are clear. Next, a second image is obtained by shooting photo at a second shutter speed lower than the first shutter speed, wherein the second shutter speed is lower than the first shutter speed, the first image and the second image are obtained by shooting photo within substantially the same shooting range, the second image includes a second object image and a second background image, the second object image is blurry but the second background image is clear. After that, a third image is generated from at least the first image and the second object image.

18 Claims, 6 Drawing Sheets

(56) References Cited

OTHER PUBLICATIONS

English translation of TIPO Office Action dated Mar. 14, 2016 in corresponding Taiwan application (No. 104125231).

* cited by examiner

ELECTRONIC DEVICE AND IMAGE PROCESSING METHOD

This application claims the benefit of Taiwan application Serial No. 104125231, filed Aug. 4, 2015, the subject matter of which is incorporated herein by reference.

BACKGROUND

Field

The disclosure relates in general to an electronic device and an image processing method, and more particularly to an electronic device and an image processing method capable of generating photos carrying sense of speed.

Description of the Related Art

In recent years, due to the advance in digital camera technology, more and more electronic devices are equipped with camera function. The users can take photos with the digital camera of the electronic device whenever and wherever they want to. This is indeed very convenient to the users. However, for an ordinary user, it is not an easy job to take a photo of an object carrying sense of speed. For example, if a moving object is shot with a high-speed shutter, the image of the moving object is virtually still in the photo, and the moving object does not look like moving. If the moving object is shot with a low-speed shutter, a moving object image is shown in the photo but is very blurry, and the main body of the moving object image cannot be clearly seen. Therefore, how to resolve the above problems and shoot a photo, in which the main body is clear and carries sense of speed, has become a prominent task for the industries.

SUMMARY

The disclosure is directed to an electronic device and an image processing method capable of generating a photo in which the main body of a moving object is clear and carries sense of speed.

According to one embodiment of the present disclosure, an image processing method is provided. The image processing method includes following steps. A first image is obtained by shooting photo at a first shutter speed, wherein the first image includes a first object image and a first background image, and the first object image and the first background image are clear. A second image is obtained by shooting photo at a second shutter speed, wherein the second shutter speed is lower than the first shutter speed, the first image and the second image are obtained by shooting photo within substantially the same shooting range, the second image includes a second object image and a second background image, the second object image is blurry but the second background image is clear. A third image is generated from at least the first image and the second object image.

The above and other aspects of the disclosure will become better understood with regard to the following detailed description of the preferred but non-limiting embodiment(s). The following description is made with reference to the accompanying drawings.

DETAILED DESCRIPTION OF THE INVENTION

Figure 1:
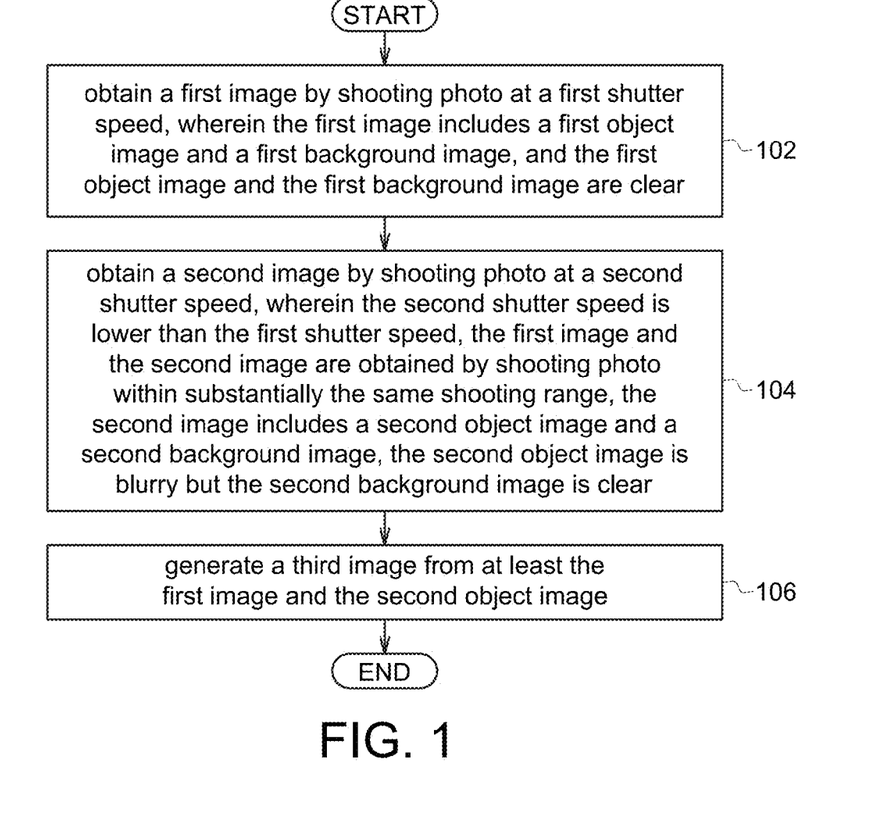
FIG. 1 is a flowchart of an image processing method according to an embodiment of the disclosure.

Referring to FIG. 1, a flowchart of an image processing method according to an embodiment of the disclosure is shown. The method of the present embodiment includes following steps. In step 102, a first image is obtained by shooting photo at a first shutter speed, wherein the first image includes a first object image and a first background image, and both the first object image and the first background image are clear. In step 104, a second image is obtained by shooting photo at a second shutter speed, wherein the second shutter speed is lower than the first shutter speed, the first image and the second image are obtained by shooting photo within substantially the same shooting range, the second image includes a second object image and a second background image, the second object image is blurry but the second background image is clear. In step 106, a third image is generated from at least the first image and the second object image.

In the present disclosure, images are shot at two different shutter speeds. In the image shot at a low shutter speed, only the still scenery is clear, and the moving object looks blurry and carries sense of speed. Since the moving object image is blurry, the object that is moving cannot be seen clearly. In the image shot at a high shutter speed, both the still scenery and the moving object image are clear. After that, by integrating the blurry image of the image shot at the low shutter speed to the image shot at the high shutter speed, an image in which the image of the main body is clear and carries sense of speed can be obtained.

Detailed descriptions of the steps of FIG. 1 are elaborated below in greater details.

Figure 2:
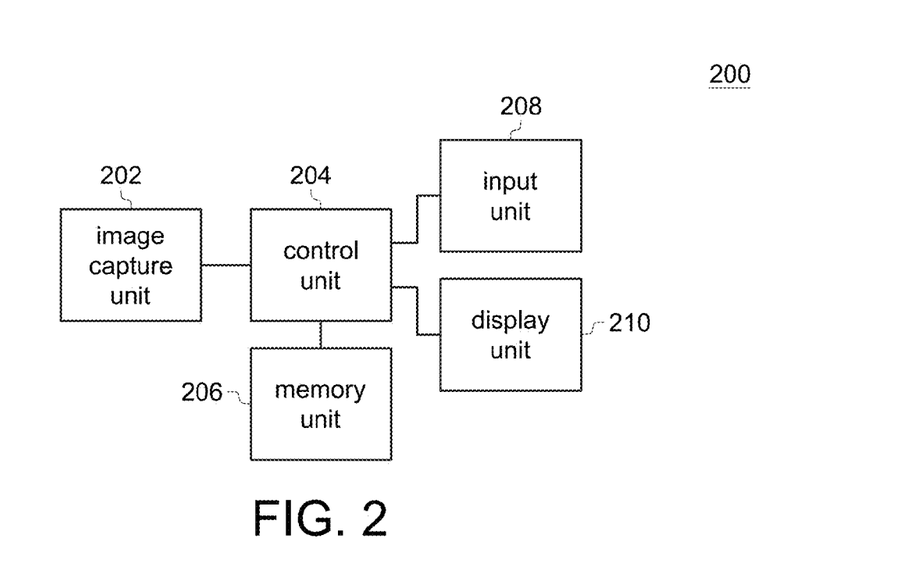
FIG. 2 is a schematic diagram of an electronic device according to an embodiment of the disclosure.

Referring to FIG. 2, a schematic diagram of an electronic device according to an embodiment of the disclosure is shown. The electronic device 200 includes an image capture unit 202, a control unit 204, a memory unit 206, an input unit 208 and a display unit 210. The control unit 204 is coupled to the image capture unit 202, the memory unit 206, the input unit 208 and the display unit 210. The electronic device 200 can be realized by such as a desktop computer, a notebook computer, a tablet PC, a smart phone or a camera. The image capture unit 202 can be realized by such as a camera lens. The control unit 204 can be realized by such as a processor or a controller. The memory unit 206 can be realized by such as a memory. The input unit 208 can be realized by a component or a device, such as a touch panel, a keyboard, a mouse, or a microphone, which allow the user to input an instruction. The display unit 210 can be realized by such as a monitor.

Referring to FIG. 1. In step 102, after the user sends a shooting instruction through the input unit 208, the control unit 204 controls the image capture unit 202 to shoot photo within a specific shooting range at the first shutter speed to obtain an image, that is, a first image. The first image includes a first object image and a first background image, and both the first object image and the first background image are clear.

In step 104, the control unit 204 controls the image capture unit 202 to shoot within substantially the same shooting range at a second shutter speed to obtain a second image, that is, a second image. The second image includes a second object image and a second background image, wherein the second object image is blurry but the second background image is clear. The second shutter speed is lower than the first shutter speed. For example, the first shutter speed is the speed of a high-speed shutter, and the second shutter speed is the speed of a low-speed shutter. To shoot a photo like the first image, in which both the object image and the background image are clear, the photo must be shot with a high-speed shutter. When adjusting the shutter speed, the aperture and ISO values can be adjusted concurrently to avoid having an insufficient exposure which may make the image frame too dark. To shoot a photo like the second image, in which the object image is blurry but the background image is clear, the photo must be shot with a low-speed shutter. When the shutter speed becomes slower, the aperture can be adjusted and the ISO values can be reduced concurrently to avoid having an overexposure which may make the image frame too bright. In the present disclosure, the high-speed shutter refers to the shutter having a faster shutter speed, and the low-speed shutter refers to the shutter having a slower shutter speed. Or, the high-speed shutter refers to the shutter capable of shooting the first image, and the second shutter refers to the shutter capable of shooting the second image.

The first object image and the second object image are images of the moving object within the shooting range, such as images of a vehicle moving at a high speed. The first background image and the second background image are images of the background within the shooting range, such as roads, houses or people. The second background image of the second image shot at the second shutter speed is clear. That the second background image is clear refers to most regions of the second background image are clear. That is, a small portion of the second background image is allowed to include a blurry object image, such as the background other than the slow-moving object shot within the shooting range. Apart from vehicles moving at a high speed, suppose there are some people walking within the shooting range. A portion of the image corresponding to people walking will be blurry, so that a small portion of the second background image will be blurry. Such scenario is also included in the scope of the present embodiment.

In step 106, the control unit 204 generates a third image from at least the first image and the second object image. That is, the third image is generated from at least a clear image (that is, the first image), and a blurry image of a moving object included in another image (that is, the second object image). For example, the control unit 204 subtracts the grayscale value of each pixel of the first image from that of corresponding pixel of the second image. The part at which the grayscale value difference equal to or close to 0 is the clear portion in the second image. It should be noted that the portion of the image at which the grayscale value difference is not over a pre-determined value can be regarded as the portion of the image at which the grayscale value difference is close to 0. The pre-determined value can be adjusted according to different needs. Then, the clear image of the second image is filtered out to obtain the blurry image of the moving object. After that, the blurry image of the moving object is overlapped with the first image to generate a third image. The memory unit 206 stores the first image, the second image and the third image. The display unit 210 displays the first image, the second image and the third image.

A number of embodiments are exemplified below.

First Exemplary Embodiment

The present embodiment, the image capture unit 202 of the electronic device 200 is a dual-lens camera module having two lenses, namely, the first lens and the second lens. Steps 102 and 104 can be performed concurrently to obtain a first image and a second image. The first lens and the second lens are, for example, adjacent to each other.

Figure 3A:
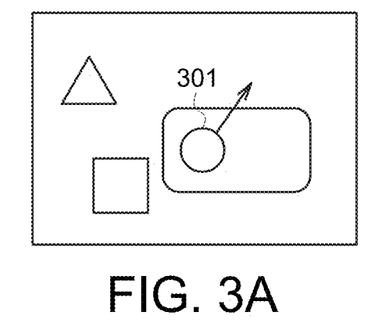
FIGS. 3A-3B schematic diagrams showing the motion of a moving object.
Figure 3B:
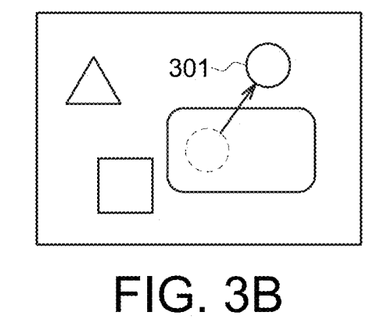
Figure 4A:
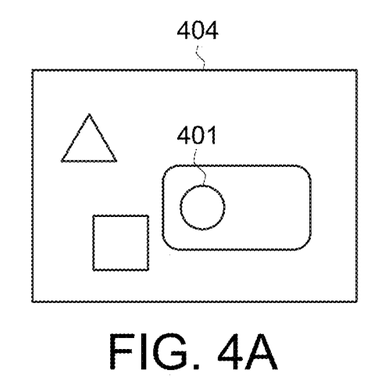
FIGS. 4A-4B are schematic diagrams of a first image obtained by the control unit using the high-speed shutter of the first lens and a second image concurrently obtained by the control unit using the low-speed shutter of the second lens.
Figure 4B:
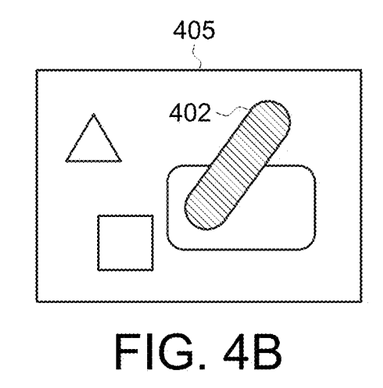

In steps 102 and 104, the control unit 204 opens the high-speed shutter of the first lens to obtain the first image, and concurrently opens the low-speed shutter of the second lens to obtain the second image. Referring to FIGS. 3A-3B, schematic diagrams of the motion of a circular object 301 are shown. In FIGS. 3A-3B, the circular object 301 is a moving object moving along an arrow direction. The portion of the image other than the circular object 301 is the background image. For example, the triangular object, the squared object and the rounded rectangle are still and are portions of the background image. FIG. 3A shows the circular object 301 at the starting point of the movement path. FIG. 3B shows the circular object 301 having been moved to the end point of the movement path. Referring to FIGS. 4A-4B, schematic diagrams of a first image obtained by the control unit 204 using the high-speed shutter of the first lens and a second image obtained by the control unit 204 concurrently using the low-speed shutter of the second lens are shown. FIG. 4A is a first image 404 obtained by the control unit 204 using the high-speed shutter of the first lens. FIG. 4B is a second image 405 obtained by the control unit 204 concurrently opening the low-speed shutter of the second lens. When the moving object is at the starting point of the movement path, the control unit 204 concurrently opens the high-speed shutter of the first lens and the low-speed shutter of the second lens. As indicated in FIG. 4A, in the first image 404 obtained using the high-speed shutter of the first lens, the moving object image 401 is at the starting point of the movement path, and both the moving object image 401 and the background image are clear. As indicated in FIG. 4B, in the second image 405 obtained using the low-speed shutter of the second lens, the moving object image 402 is blurry but the background image is clear.

Figure 4C:
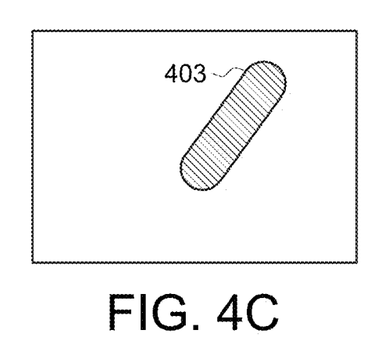
FIGS. 4C-4D are schematic diagrams of a third object image and a third image generated by overlapping the third object image with the first image.
Figure 4D:
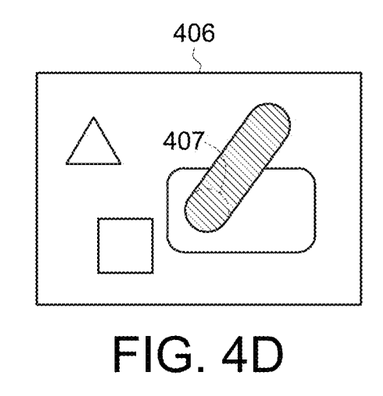

After the first image 404 and the second image 405 are obtained, the method proceeds to step 106. In step 106, the control unit 204 generates a third object image 403, and further overlaps the third object image 403 with the first image 404 to generate a third image. Referring to FIGS. 4C-4D, schematic diagrams of a third object image and a third image generated by overlapping the third object image with the first image are shown. For example, the control unit 204 subtracts the grayscale value of each pixel of the first image 404 from that of corresponding pixel of the second image 405. In the second image 405, the pixels having a grayscale value difference equal or close to 0 are removed. That is, the portion of still image is filtered out in the second image 405. As indicated in FIG. 4C, the blurry moving object image, that is, the third object image 403, can be obtained from the second image 405. The third object image 403 obtained from the second image 405 corresponds to the moving object image 402 of the second image 405.

After the third object image 403 is obtained, the control unit 204 overlaps the third object image 403 with the first image 404 to generate a third image 406. In the third image 406, the moving object image 407 is an image corresponding to the moving object image 401, and the moving object image 407 is an overlapped image. Furthermore, the control unit 204 overlaps the third object image 403 with the first image 404 according to a weight to generate the third image 406. For example, during the overlapping process, the grayscale value of each pixel of the third object image 403 is multiplied by 20%, and the grayscale value of corresponding pixel of the first image 404 is multiplied by 80%. Then, the two products are added up as the grayscale value of the overlapped pixel. As indicated in FIG. 4D, the third image 406 generated by overlapping the third object image 403 with the first image 404 according to a weight is a clear background image, the moving object image is a bit blurry, but the moving object image can be clearly seen.

Second Exemplary Embodiment

The present embodiment is different from the first embodiment in that in steps 102 and 104, the control unit 204, having opened the low-speed shutter of the second lens for a time interval, opens the high-speed shutter of the first lens and shuts the high-speed shutter of the first lens and the low-speed shutter of the second lens concurrently, such that the first image and the second image are obtained respectively.

Figure 5A:
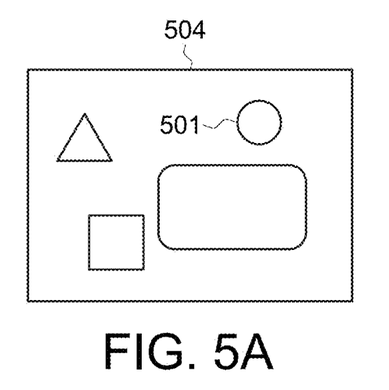
FIGS. 5A-5B schematic diagrams of a first image and a second image obtained by the control unit shutting the high-speed shutter of the first lens and the low-speed shutter of the second lens concurrently.
Figure 5B:
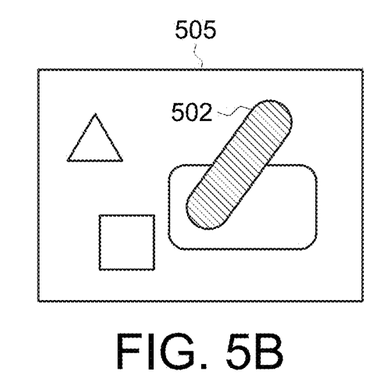

Let the shooting of the motion of the moving object of FIG. 3 be taken for example. Referring to FIGS. 5A-5B, schematic diagrams of a first image and a second image obtained by the control unit 204 shutting the high-speed shutter of the first lens and the low-speed shutter of the second lens concurrently are shown. FIG. 5A is a first image 504 obtained by the control unit 204 using the high-speed shutter of the first lens. FIG. 5B is a second image 505 obtained by the control unit 204 using the low-speed shutter of the second lens. To shut the high-speed shutter of the first lens and the low-speed shutter of the second lens having different shutter speeds concurrently, the control unit 204 opens the high-speed shutter of the first lens after having opened the low-speed shutter of the second lens for a time interval.

Figure 5C:
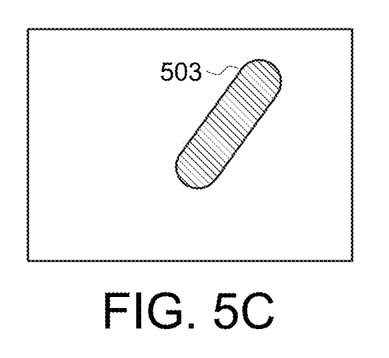
FIGS. 5C-5D are schematic diagrams of a third object image and a third image generated by overlapping the third object image with the first image.
Figure 5D:
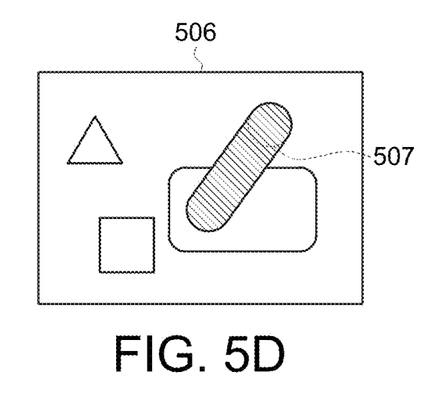

When the moving object is at the starting point of the movement path, after the control unit 204 has opened the low-speed shutter of the second lens to shoot photos for a time interval, the control unit 204 opens the high-speed shutter of the first lens. As indicated in FIG. 5A, in the first image 504 obtained using the high-speed shutter of the first lens, the moving object image 501 is at the end point of the movement path, and both the moving object image 501 and the background image are clear. As indicated in FIG. 5B, in the second image 505 obtained using the low-speed shutter of the second lens, the moving object image 502 is blurry but the background image is clear. After the first image 504 and the second image 505 are obtained, the method proceeds to step 106. Referring to FIGS. 5C-5D, schematic diagrams of a third object image and a third image generated by overlapping the third object image with the first image are shown. As indicated in FIG. 5C, the control unit 204 subtracts the first image 504 from the second image 505, and in the second image 505, the pixels whose grayscale values are equal or close to that of corresponding pixels of the first image 504 are filtered out to obtain the third object image 503. As indicated in FIG. 5D, the control unit 204 overlaps the third object image 503 with the first image 504 according to a weight to generate a third image 506. In the third image 506, the moving object image 507 is an image corresponding to the moving object image 501, and the moving object image 507 is an overlapped image. In the third image 506, the moving object image is blurry but the image of the moving object is clear. In the present embodiment, details of subtracting and overlapping images as disclosed in step 106 are similar to the descriptions disclosed in the first embodiment, and the similarities are not repeated here.

Third Exemplary Embodiment

Figure 6A:
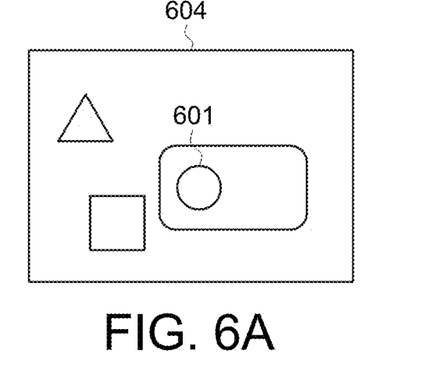
FIGS. 6A-6B are schematic diagrams of a first image obtained by the control unit using the high-speed shutter of a lens and a second image obtained by the control unit using the low-speed shutter of the same lens.
Figure 6B:
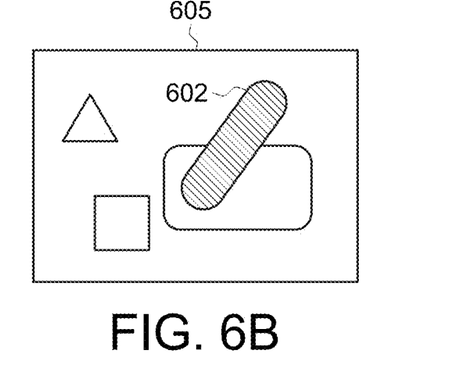
Figure 6C:
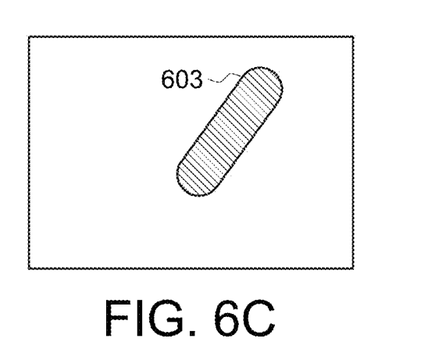
FIGS. 6C-6D are schematic diagrams of a third object image, and a third image generated by overlapping the third object image with the first image.
Figure 6D:
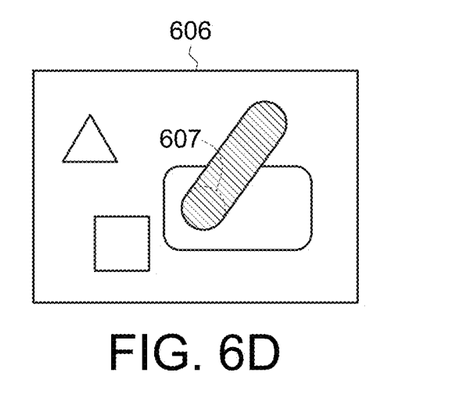

The present embodiment is different from the first embodiment in that the image capture unit 202 of the electronic device 200 has only one lens. In step 102, after the control unit 204 obtains the first image with the high-speed shutter of a lens, the method proceeds to step 104, the control unit 204 obtains the second image with the low-speed shutter of the same lens. Referring to FIGS. 6A-6B, schematic diagrams of a first image obtained by the control unit 204 using the high-speed shutter of a lens and a second image obtained by the control unit using the low-speed shutter of the same lens are shown. FIG. 6A is a first image 604 obtained by the control unit 204 using the high-speed shutter of a lens. FIG. 6B is a second image 605 obtained by the control unit 204 using the low-speed shutter of the same lens. When the moving object is at the starting point of the movement path, after the control unit 204 obtains the first image 604 with the high-speed shutter of a lens, the control unit 204 obtains the second image 605 with the low-speed shutter of the same lens. As indicated in the first image 604 of FIG. 6A, the moving object image 601 is at the starting point of the movement path, and both the moving object image 601 and background image are clear. As indicated in the second image 605 of FIG. 6B, the moving object image 602 is blurry but the background image is clear. After the first image 604 and the second image 605 are obtained, the method proceeds to step 106. Referring to FIGS. 6C-6D, schematic diagrams of a third object image, and a third image generated by overlapping the third object image with the first image are shown. As indicated in FIG. 6C, the control unit 204 subtracts the first image 604 from the second image 605, and in the second image 605, the pixels whose grayscale values are equal or close to that of corresponding pixels of the first image 604 are filtered out to obtain the third object image 603. As indicated in FIG. 6D, the control unit 204 overlaps the third object image 603 with the first image 604 according to a weight to generate a third image 606. In the third image 606, the moving object image 607 is an image corresponding to the moving object image 601, and the moving object image 607 is an overlapped image. In the third image 606, the moving object image is blurry but the image of the moving object is clear. In the present embodiment, details of subtracting and overlapping images as disclosed in step 106 are similar to the descriptions disclosed in the first embodiment, and the similarities are not repeated here.

Fourth Exemplary Embodiment

Figure 7A:
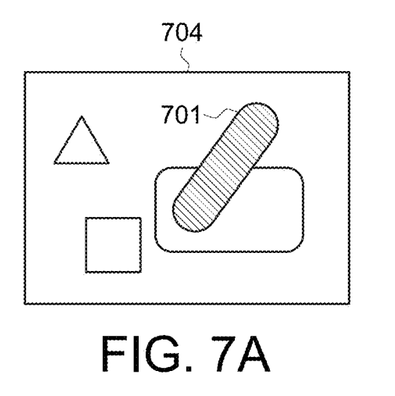
FIGS. 7A-7B are schematic diagrams of a first image obtained by the control unit using the low-speed shutter of a lens and a second image obtained by the control unit using the high-speed shutter of the same lens.
Figure 7B:
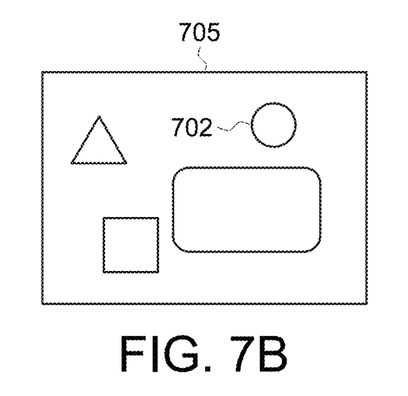
Figure 7C:
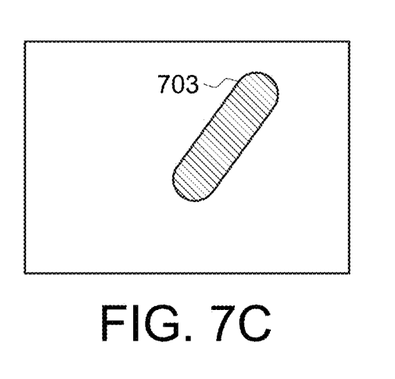
FIGS. 7C-7D are schematic diagrams of a third object image and a third image generated by overlapping the third object image with the first image.
Figure 7D:
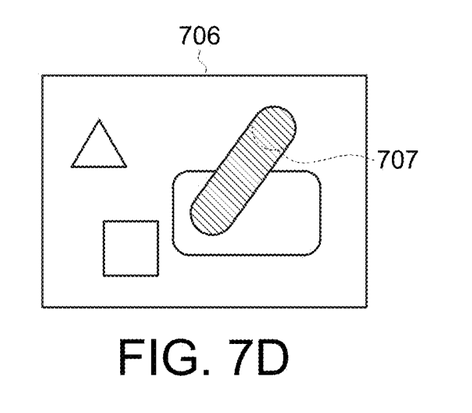

The present embodiment is different from the third embodiment in that step 102 is performed after step 104 is completed. In step 104, the control unit 204 obtains the second image with the low-speed shutter of a lens. Then, the method proceeds to step 102, the control unit 204 obtains the first image with the high-speed shutter of the same lens. Referring to FIGS. 7A-7B, schematic diagrams of a first image obtained by the control unit 204 using the low-speed shutter of a lens and a second image obtained by the control unit 204 using the high-speed shutter of the same lens are shown. FIG. 7A is a second image 704 obtained by the control unit 204 using the low-speed shutter of a lens. FIG. 7B is a first image 705 obtained by the control unit 204 using the high-speed shutter of the same lens. When the moving object is at the starting point of the movement path, after the control unit 204 obtains the second image 704 with the low-speed shutter of a lens, the control unit 204 obtains the first image 705 with the high-speed shutter of the same lens. As indicated in the second image 704 of FIG. 7A, the moving object image 701 is blurry but the background image is clear. As indicated in the first image 705 of FIG. 7B, the moving object image 702 is at the end point of the movement path, both the moving object image 701 and background image are clear. After the first image 705 and the second image 704 are obtained, the method proceeds to step 106. Referring to FIGS. 7C-7D, schematic diagrams of a third object image and a third image generated by overlapping the third object image with the first image are shown. As indicated in FIG. 7C, the control unit 204 subtracts the first image 705 from the second image 704, and in the second image 704, the pixels whose grayscale values are equal or close to that of corresponding pixels of the first image 705 are filtered out to obtain the third object image 703. As indicated in FIG. 7D, the control unit 204 overlaps the third object image 703 with the first image 705 according to a weight to generate a third image 706. In the third image 706, the moving object image 707 is an image corresponding to the moving object image 702, and the moving object image 707 is an overlapped image. In the third image 706, the moving object image is blurry, but the image of the moving object is clear. In the present embodiment, details of subtracting and overlapping images as disclosed in step 106 are similar to the descriptions disclosed in the first embodiment, and the similarities are not repeated here.

Fifth Exemplary Embodiment

The present embodiment is different from the first embodiment in that in step 106, the control unit 204 does not subtract the first image from the second image but directly overlaps the first image with the second image to generate a third image. Furthermore, the control unit 204 overlaps the first image with the second image according to a weight to generate a third image. For example, during the overlapping process, the grayscale value of each pixel of the second image is multiplied by 20%, and the grayscale value of corresponding pixel of the first image is multiplied by 80%. Then, the two products are added up as the grayscale value of the overlapped pixel. The weight can be adjusted according to users' needs. For example, to make the moving object clearer, a larger weight is assigned to the image obtained at a faster shutter speed, that is, the first image. To enhance the blurring effect of the moving object, a larger weight is assigned to the image obtained at a slower shutter speed, that is, the second image. Thus, the third image generated by overlapping the first image with the second image directly without subtracting the first image from the second image is a clear background image, the moving object image is a bit blurry but the image of the moving object can be clear seen.

Figure 8:
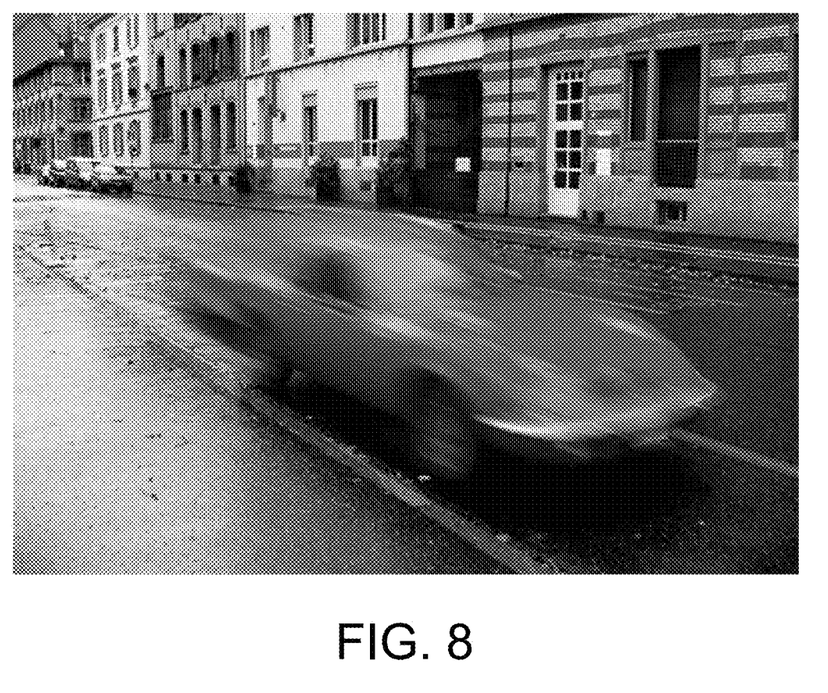
FIG. 8 is an image in which the main body carries sense of speed.

According to the image processing method disclosed in above embodiments of the invention, the image, in which the main body is clear and carries has sense of speed, can be obtained by shooting photo at different shutter speeds and further overlapping the photos. FIG. 8 is an example of a photo of blurry image with a moving main body. Through the image processing method of the embodiments of the invention, a clear image of the main body can overlap the photo of FIG. 8 to generate a photo carrying sense of speed. The photo is formed of a clear image of the main body and a blurry image in which the blurring is caused by motion. Therefore, according to the image processing method of the present invention, a person without expertise of photography still can take a photo in which the main body of the moving object has clear image and carries sense of speed, such that the electronic device can provide a diversity of camera functions and product experience to the users to enhance the market competitiveness.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing method, comprising:
    obtaining a first image by shooting photo at a first shutter speed, wherein the first image comprises a first object image and a first background image, and the first object image and the first background image are clear;
    obtaining a second image by shooting photo at a second shutter speed, wherein the second shutter speed is lower than the first shutter speed, the first image and the second image are obtained by shooting photo within substantially the same shooting range, the second image comprises a second object image and a second background image, the second object image is blurry but the second background image is clear; and
    generating a third image from at least the first image and the second object image;
    wherein the step of generating the third image further comprises:
    subtracting the first image from the second image to obtain a third object image, the third object image corresponding to the second object image; and
    overlapping the third object image with the first image to generate the third image.

2. The image processing method according to claim 1, wherein the step of overlapping the third object image with the first image to generate the third image further comprises:
    overlapping the third object image with the first image according to a weight to generate the third image.

3. The image processing method according to claim 1, wherein in the step of obtaining the first image and the second image, the first image and the second image are obtained through a dual-lens camera module.

4. The image processing method according to claim 3, wherein the dual-lens camera module has a first lens and a second lens, the first image is obtained by opening the high-speed shutter of the first lens, and the second image is obtained by concurrently opening the low-speed shutter of the second lens.

5. The image processing method according to claim 3, wherein the dual-lens camera module has a first lens and a second lens, after the low-speed shutter of the second lens has been opened for a time interval, the high-speed shutter of the first lens is opened, and the high-speed shutter of the first lens and the low-speed shutter of the second lens are shut concurrently, such that the first image and the second image are obtained respectively.

6. The image processing method according to claim 1, wherein in the step of obtaining the first image and the second image, the first image is obtained through a lens using the high-speed shutter, and the second image is obtained through the lens using the low-speed shutter.

7. The image processing method according to claim 6, wherein after the first image is obtained through the lens using the high-speed shutter, the second image is obtained through the lens using the low-speed shutter.

8. The image processing method according to claim 6, wherein after the second image is obtained through the lens using the low-speed shutter, the first image is obtained through the lens using the high-speed shutter.

9. The image processing method according to claim 1, wherein the step of generating the third image comprises:
overlapping the first image with the second image to generate the third image.

10. An electronic device, comprising:
an image capture circuit; and
a control circuit coupled to the image capture circuit, the control circuit for controlling the image capture circuit to obtain a first image by shooting photo at a first shutter speed and controlling the image capture circuit to obtain a second image by shooting photo at a second shutter speed, wherein the second shutter speed is lower than the first shutter speed, the first image comprises a first object image and a first background image, and the second image comprises a second object image and a second background image;
wherein, the first image and the second image are obtained by shooting photo within substantially the same shooting range, and in the first image, both the first object image and the first background image are clear, in the second image, the second object image is blurry but the second background image is clear, and the control circuit generates a third image from at least the first image and the second object image;
wherein the control circuit further subtracts the first image from the second image to obtain a third object image, the third object image corresponding to the second object image, and the control circuit overlaps the third object image with the first image to generate the third image.

11. The electronic device according to claim 10, wherein the control circuit further overlaps the third object image with the first image to generate the third image according to a weight.

12. The electronic device according to claim 10, wherein the image capture circuit is a dual-lens camera module.

13. The electronic device according to claim 12, wherein the dual-lens camera module has a first lens and a second lens, the control circuit opens the high-speed shutter of the first lens to obtain the first image, and concurrently opens the low-speed shutter of the second lens to obtain the second image.

14. The electronic device according to claim 12, wherein the dual-lens camera module has a first lens and a second lens, after the control circuit controls the low-speed shutter of the second lens to be opened for a time interval, the control circuit controls the high-speed shutter of the first lens to be opened and shuts the high-speed shutter of the first lens and the low-speed shutter of the second lens concurrently, such that the first image and the second image are obtained respectively.

15. The electronic device according to claim 10, wherein the image capture circuit has a lens, the control circuit controls the lens to obtain the first image with the high-speed shutter, and controls the lens to obtain the second image with the low-speed shutter.

16. The electronic device according to claim 15, wherein after the control circuit controls the lens to obtain the first image with the high-speed shutter, the control circuit controls the lens to obtain the second image with the low-speed shutter.

17. The electronic device according to claim 15, wherein after the control circuit controls the lens to obtain the second image with the low-speed shutter, the control circuit controls the lens to obtain the first image with the high-speed shutter.

18. The electronic device according to claim 10, wherein the control circuit further overlaps the first image with the second image to generate the third image.

* * * * *